US006721082B1

(12) United States Patent
Furlani et al.

(10) Patent No.: US 6,721,082 B1
(45) Date of Patent: Apr. 13, 2004

(54) ELECTROTHERMAL DIFFRACTION GRATING

(75) Inventors: Edward P. Furlani, Lancaster, NY (US); John A. Lebens, Rush, NY (US); Christopher N. Delametter, Rochester, NY (US); Constantine N. Anagnostopoulos, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/271,099

(22) Filed: Oct. 15, 2002

(51) Int. Cl.⁷ .................. G02B 26/00; G02B 26/08; G02F 1/01
(52) U.S. Cl. ................. 359/290; 359/288; 359/224
(58) Field of Search ................. 359/213, 224, 359/288, 290, 291, 295, 298, 572, 573

(56) References Cited

U.S. PATENT DOCUMENTS

| 4,011,009 | A |   | 3/1977  | Lama et al. ........... 359/571 |
| 5,115,344 | A |   | 5/1992  | Jaskie .................. 359/573 |
| 5,311,360 | A |   | 5/1994  | Bloom et al. .......... 359/572 |
| 6,141,139 | A | * | 10/2000 | Furlani et al. ........ 359/280 |
| 6,147,789 | A | * | 11/2000 | Gelbart ................. 359/231 |
| 6,181,458 | B1 | * | 1/2001  | Brazas et al. .......... 359/290 |

* cited by examiner

*Primary Examiner*—Georgia Epps
*Assistant Examiner*—William Choi
(74) *Attorney, Agent, or Firm*—Raymond L. Owens

(57) ABSTRACT

A modulator for modulating an incident beam of light, includes a structure defining a cavity and having a base and side walls surrounding the base; a first plurality of equally spaced apart thermally deformable reflective members having opposing end edges integrally formed in the side walls of the structure above the cavity.

11 Claims, 9 Drawing Sheets

ELECTROTHERMAL DIFFRACTION GRATING

FIELD OF THE INVENTION

This invention relates to a modulator for modulating a beam of light having selectively thermally deformable members for providing a diffraction grating.

BACKGROUND OF THE INVENTION

Electro-mechanical spatial light modulators are used in a variety of applications, including image processing, display, optical computing and printing, and wavelength division multiplexing and spectrometers. Electro-mechanical gratings are well known in the patent literature, see U.S. Pat. No. 4,011,009, "Reflection diffraction grating having a controllable blaze angle," issued on Mar. 8, 1977 to W. L. Lama et al and U.S. Pat. No. 5,115,344, "Tunable diffraction grating," issued on May 19, 1992 to J. E. Jaskie. More recently, Bloom et al described an apparatus and method of fabrication for a device for optical beam modulation, known to one skilled in the art as a grating-light valve (GLV), see U.S. Pat. No. 5,311,360, "Method and apparatus for modulating a light beam," issued on May 10, 1994. According to the prior art, for operation of the GLV device, an attractive electrostatic force is produced by a single polarity voltage difference between the ground plane and the conducting layer atop a plurality of deformable members called ribbons. This attractive force changes the heights of the ribbons relative to the substrate. By modulating the voltage waveform, it is possible to modulate the diffracted optical beam as needed by the specific application.

One problem with the prior art light modulators is that they use an electrostatic activation force that is nonlinear. Specifically, as the voltage applied to the modulator increases from zero, the activated deformable members (ribbons) deflect incrementally until they reach approximately ⅓ of their full scale deflection, and then they jump the remaining distance until they impact the substrate. Because of this limited range of motion, such modulators are typically designed to efficiently diffract a single wavelength of light. Moreover, they have a relatively high activation voltage, and encounter stiction problems when the deformable members contact the substrate. Therefore, a need exists for a modulator that can efficiently diffract a range of wavelengths, that can operate at relatively low voltages, and that can operate without the deformable members contacting the substrate to eliminate stiction.

SUMMARY OF THE INVENTION

It is an object of the present invention to provide a modulator for modulating an incident beam of light by providing more versatile deformable members.

The object is achieved in a modulator for modulating an incident beam of light, comprising:
 a structure defining a cavity and having a base and side walls surrounding the base;
 a first plurality of equally spaced apart thermally deformable reflective members having opposing end edges integrally formed in the side walls of the structure above the cavity, wherein each one of the plurality of thermally deformable members includes at least a top layer and a bottom layer, wherein the top layer is conductive, and has a higher coefficient of thermal expansion than the bottom layer, and wherein the top layer has end sections adjacent to the support walls and a midsection, with the end sections having a higher resistance than the midsection;
 a second plurality of equally spaced apart, electrically isolated fixed members having opposing end edges integrally formed in the side walls of the structure just above the cavity, wherein each one of the second plurality of fixed members has a reflective top surface for reflecting the incident beam of light, and wherein each fixed member of the second plurality of fixed members is arranged between adjacent spaced apart deformable members of the plurality of thermally deformable members such that the deformable members and the fixed members form a substantially planar light reflection surface; and
 means for applying current through the top layers of the first plurality of equally spaced apart thermally deformable reflective members that causes them to deflect into the cavity and away from the substantially planar light reflection surface, whereby light reflecting from the first plurality of thermally deformable reflective members destructively interferes with light reflected from the second plurality of fixed members thereby causing modulation of the incident light.

An advantage of the light modulator of the invention is it can efficiently diffract a range of wavelengths because its thermally deformable members can be deformed over the full range of their motion. A further advantage is that it can operate at lower voltages than competitive electrostatically activated light modulators. An additional advantage of the invention is that the thermally deformable members do not contact any surfaces during their motion thereby eliminating the problem of stiction.

DETAILED DESCRIPTION OF THE PREFERRED EMBODIMENTS

Figure 1:
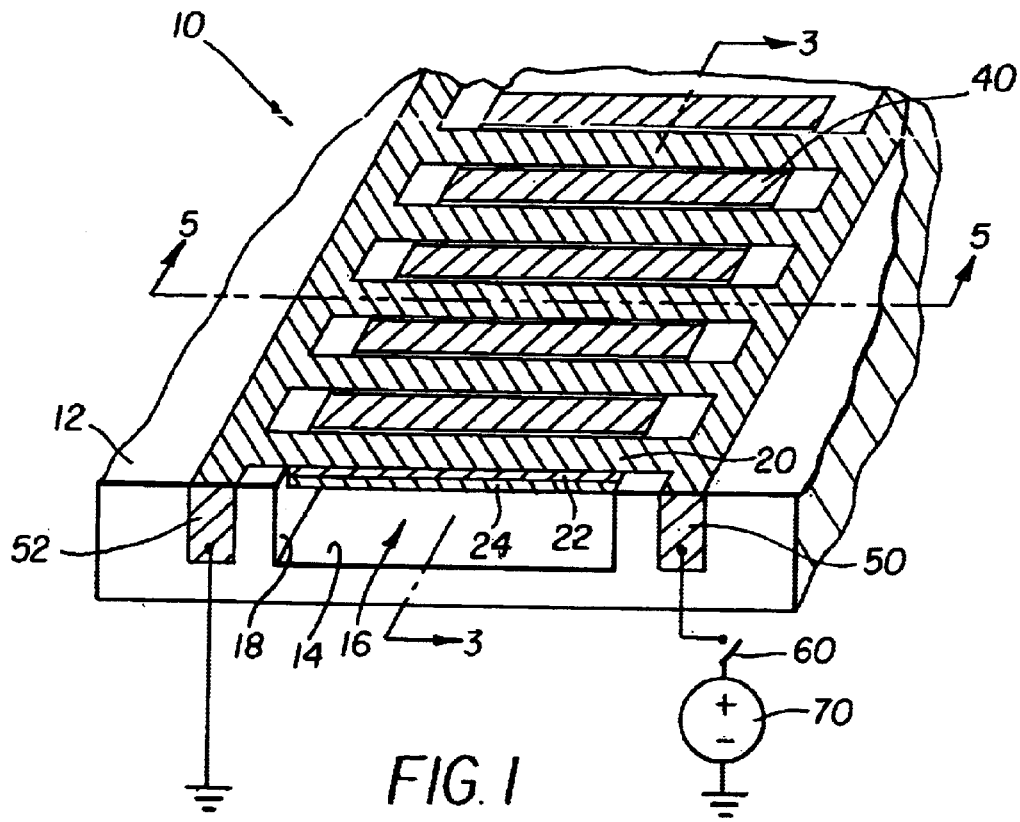
FIG. 1 is a perspective of a modulator of the invention in an unactivated state.

Referring to FIG. 1, a perspective of a light modulator 10 of the invention in an unactivated state is shown. The light modulator 10 includes a structure 12 having a base 14, a cavity 16 with side walls 18, a first plurality of equally spaced apart thermally deformable reflective members 20, and a second plurality of equally spaced apart electrically isolated fixed reflective members 40. The first plurality of thermally deformable reflective members 20 and the second plurality of fixed reflective members 40 are supported at both ends above the cavity 16, with both ends integrally formed in the side walls 18.

Figure 8:
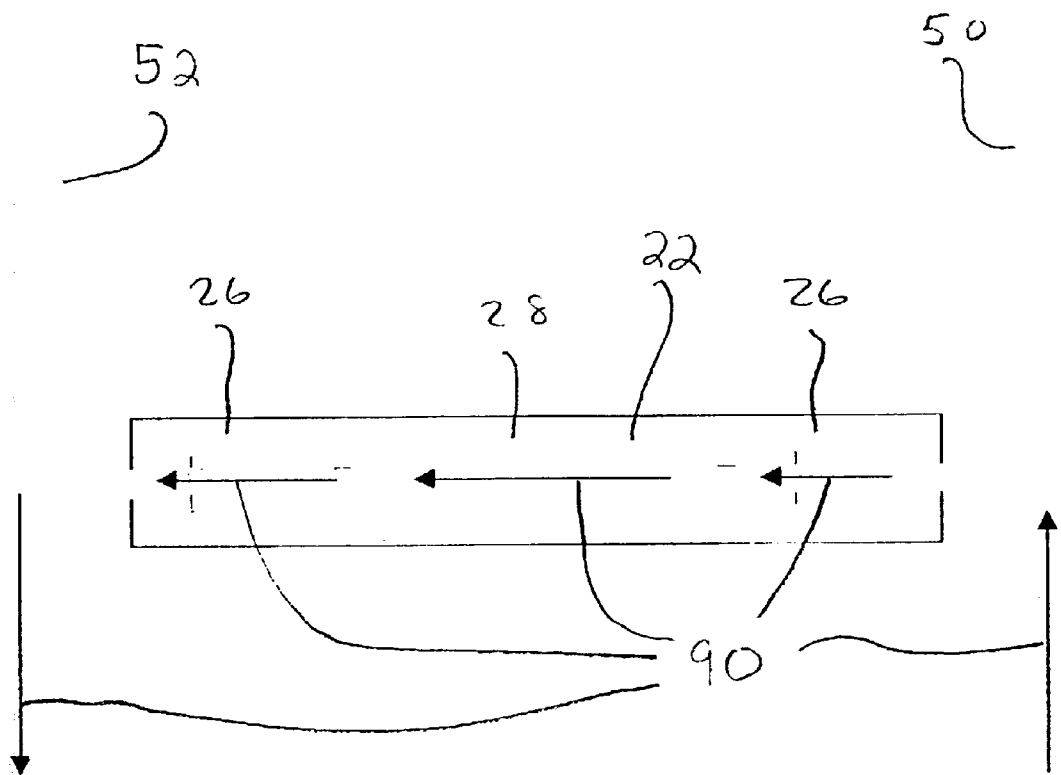
FIG. 8 is a top schematic view of a thermally deformable member showing the conductive top layer.

Each one of the first plurality of thermally deformable reflective members 20 includes at least two layers, a top layer 22 and a bottom layer 24. The top layer 22 is constructed from a light reflecting and electrically resistive material having a coefficient of thermal expansion greater than that of the bottom layer 24. The top layer 22 has end sections 26 adjacent to the side walls 18 and a midsection 28 as shown in FIG. 8. The end sections 26 have a higher resistance than the midsection 28 as will be described. The bottom layer 24 is constructed from an electrical insulator material, and as already noted, has a coefficient of thermal expansion lower than that of the top layer 22. The top layer 22 preferably includes materials selected from the group consisting of: aluminum, copper, gold, silver, and alloys thereof. The bottom layer 24 is preferably silicon nitride or silicon dioxide. It is understood that each of the first plurality of thermally deformable reflective members 20 can be fabricated using any number of layers and still retain the same functional performance.

Figure 2:
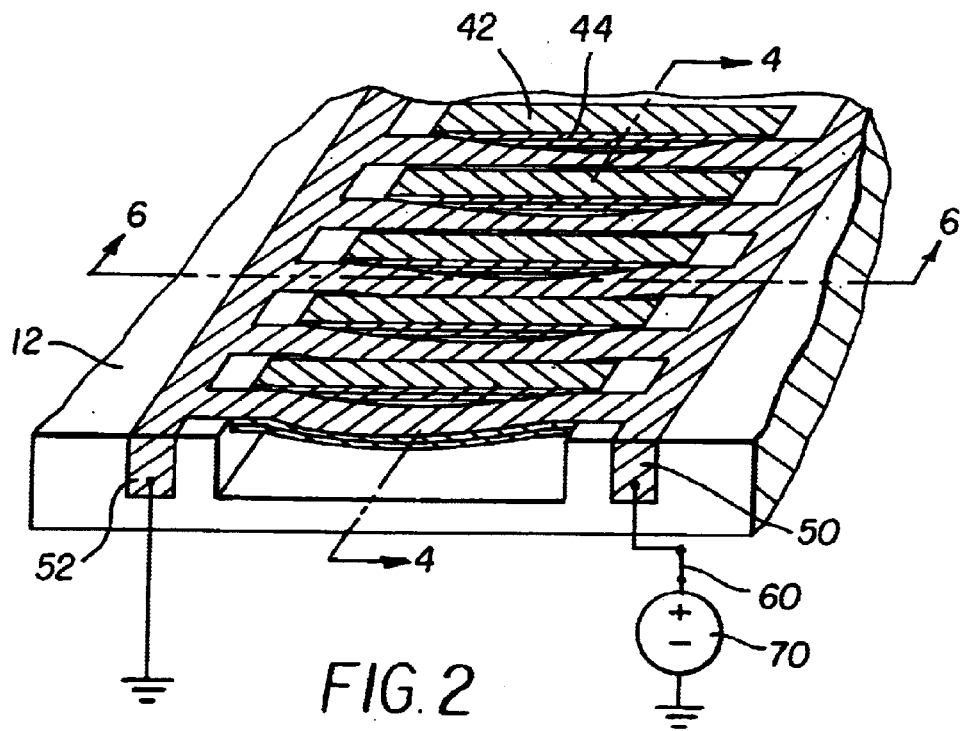
FIG. 2 is a perspective of a modulator of the invention in an activated state.

Each one of the second plurality of fixed members 40 preferably has a top light reflecting layer 42, and a bottom support layer 44 as shown in FIG. 2. The light reflecting layer 42 preferably includes materials selected from the group consisting of: aluminum, copper, gold, silver, and alloys thereof. The bottom support layer 44 is preferably silicon nitride or silicon dioxide.

Each one of the second plurality of fixed members 40 is arranged between adjacent spaced apart members of the first plurality of thermally deformable reflective members 20 such that the top layers 22 and the light reflection layers 42 form a substantially planar light reflection surface as shown.

There are conductive elements 50 and 52 arranged in the side walls 18 on structure 12 in proximity to the first plurality of thermally deformable reflective members 20 as shown. The conductive element 50 is connected to a switch 60, which in turn, is connected to a power source 70. The conductive element 50 is also connected to one end of the top layer 22 of the first plurality of deformable reflective members 20 as shown. The conductive element 52 is connected to the opposite end of the top layer 22, and is also connected to an electrical ground as shown. Therefore, when the switch 60 is closed, current will flow from the power source 70 through the conductive element 50, through the top layer 22 of the first plurality of thermally deformable reflective members 20, and through the conductive element 52 to ground.

Referring to FIG. 2, a perspective of the light modulator 10 is shown in an activated state. The switch 60 is closed thereby causing current to flow in the top layer 22 of the first plurality of thermally deformable reflective members 20. The current causes joule heating of the top layer 22, which in turn, causes the temperature of the top layer 22 to increase. The top layer 22 has a higher resistance in its end sections 26, and therefore the heating is concentrated in these sections which are adjacent to the side walls 18 as shown in FIG. 8. Consequently, the end sections 26 of the top layer 22 achieve a higher temperature than the midsection 28 which has a lower resistance. As the temperature of the top layer 22 increases it tends to expand in accordance with its coefficient of thermal expansion. Moreover, because the heating is concentrated at the end sections 26, they tend to expand more than the midsection 28. As the first plurality of thermally deformable reflective members 20 heat up, their top layer 22 is initially at a higher temperature than their bottom layer 24 because it takes time for the thermal energy to diffuse from the top layer 22 into the bottom layer 24. The thermal expansion of the top layer 22 of the first plurality of thermally deformable reflective members 20 is greater than the bottom layer 24 which is initially at a lower temperature and has a lower coefficient of thermal expansion. This mismatch in expansion causes the first plurality of thermally deformable reflective members 20 to deform downward toward the substrate as shown. The power source is designed to supply enough energy to cause the midsection 28 of the first plurality of thermally deformable reflective members 20 to deflect a distance substantially $\lambda/4$ downward, where $\lambda$ is the wavelength of the incident light (see FIG. 4).

Figure 3:
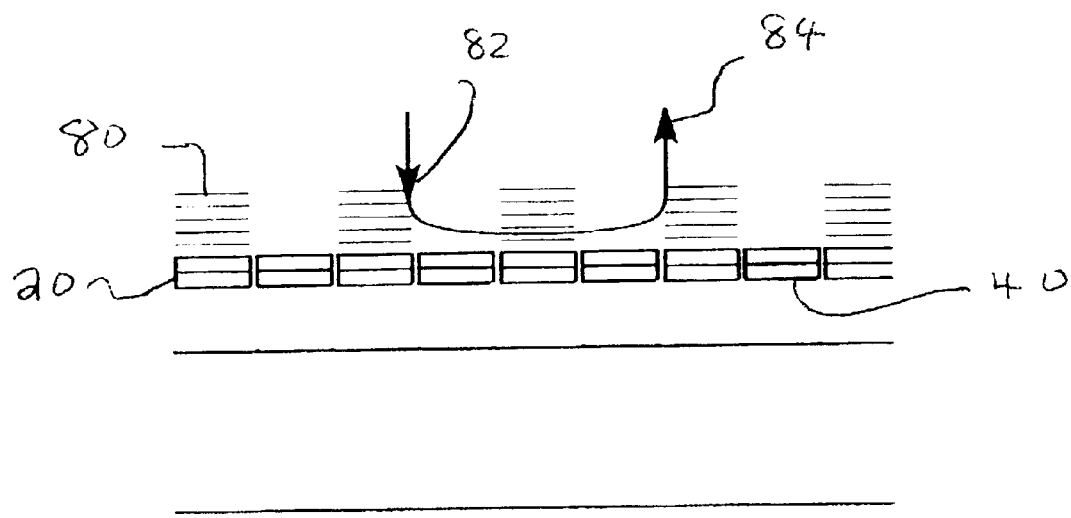
FIG. 3 is a sectional view of the modulator of FIG. 1 taken along line 3—3 of FIG. 1 wherein the thermally deformable members are in the up position.

In FIG. 3 the light modulator 10 is shown in a sectional view taken along line 3—3 in FIG. 1. The light modulator 10 is shown with the switch 60 open so that there is no current flowing through top layer 22 of the first plurality of thermally deformable reflective members 20. When no current flows, the first plurality of thermally deformable reflective members 20 are flat (in an up position). The modulator is designed so that when a light wave 80 of wavelength $\lambda$ of the incident light impinges perpendicularly to the surface of the light modulator 10 as indicated by arrow 82, the light reflected from the top layer 22 of the first plurality of thermally deformable reflective members 20 is in phase with the light reflected from the second plurality of fixed reflective members 40 and consequently the light modulator 10 reflects light as a flat mirror as indicated by arrow 84.

Figure 4:
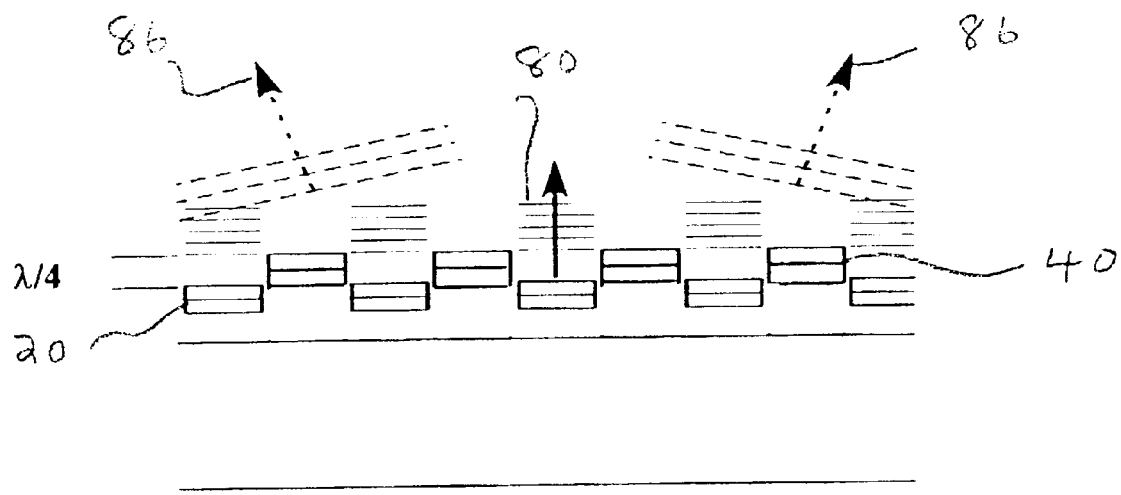
FIG. 4a is sectional view of the modulator of FIG. 2 taken along line 4—4 of FIG. 2 wherein the thermally deformable members are in the down position.

In FIG. 4 a sectional view is shown of the light modulator 10 taken along line 4—4 of FIG. 2 wherein switch 60 is closed and the first plurality of thermally deformable reflective members 20 are in an activated down position with their midsection 28 a distance of substantially $\lambda/4$ from their undeformed position as shown. When a lightwave 80 of wavelength $\lambda$ impinges perpendicularly to the surface of the light modulator 10 when the first plurality of thermally deformable reflective members 20, the light reflected from the activated first plurality of thermally deformable reflective members 20 is out of phase with the light reflected from the second plurality of fixed reflective members 40, and the light modulator 10 diffracts the incident light into the directions indicated by arrows 86.

Figure 5:
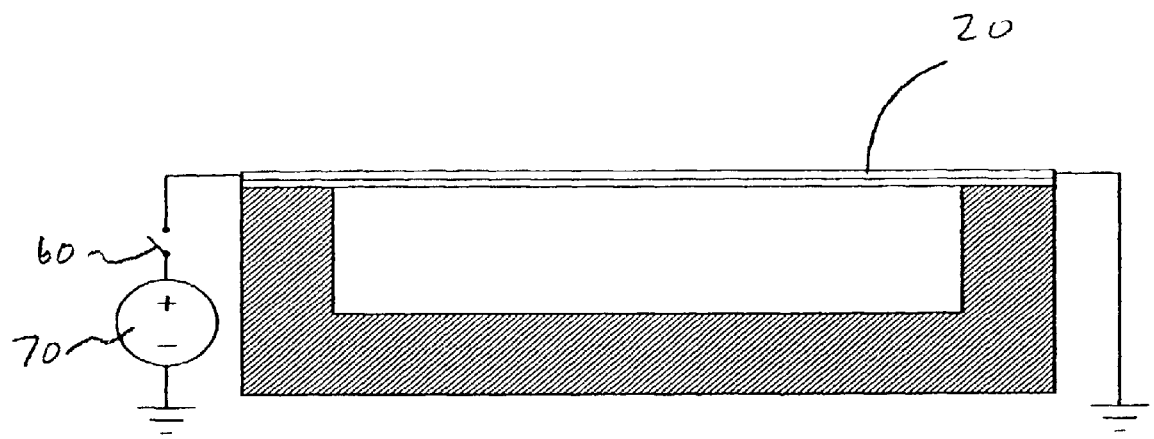
FIG. 5 is a sectional view of the modulator of FIG. 1 taken along line 5—5 of FIG. 1 wherein the thermally deformable members are in the up position.

Referring to FIG. 5, a sectional view is shown of the light modulator 10 taken along line 5—5 of FIG. 1, wherein the first plurality of thermally deformable reflective members 20 are in an unactivated up position (i.e., switch 60 is open).

Figure 6:
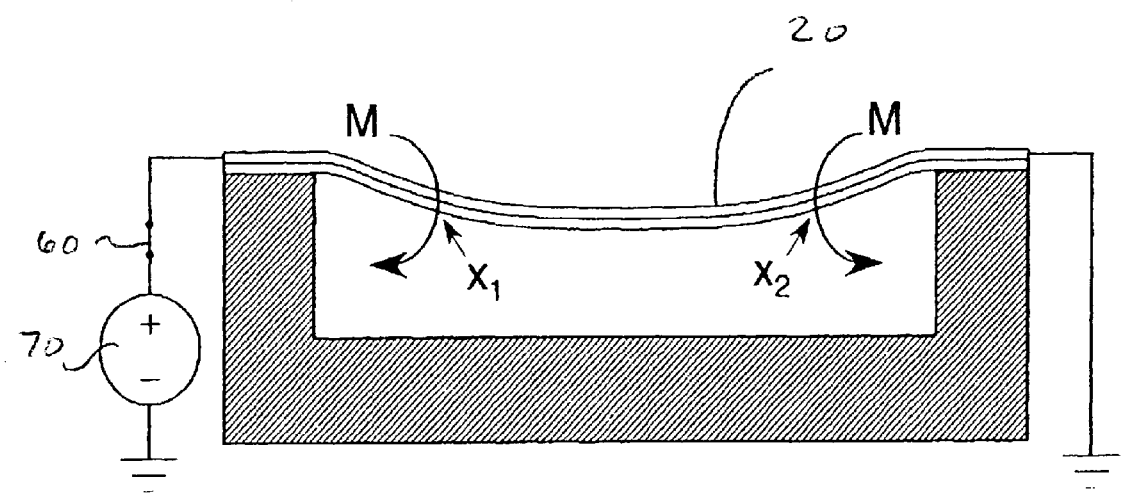
FIG. 6 is a sectional view of the modulator of FIG. 2 taken along line 6—6 of FIG. 2 wherein the thermally deformable members are in the down position.

In FIG. 6 the light modulator 10 is shown in a sectional view taken along line 6—6 in FIG. 2. The switch 60 is closed thereby causing current to flow in the top layer 22 of the first plurality of thermally deformable reflective members 20. The top layer 22 has a higher resistance at its end sections 26 than across its midsection 28 (see FIG. 8). Therefore, the end sections 26 achieve a higher temperature than the midsection 28. The thermal deformation of the first plurality of thermally deformable reflective members 20 can be predicted to first-order by assuming that a thermal moment M exists at the edges of the end sections 26 which are labeled $x_1$ and $x_2$ as shown. The deformation can be determined by solving the following coupled thermo-elastic equations:

$$\frac{d^2 y}{dx^2} = \frac{M(T, x)}{EI},$$

and $$\frac{\partial^2 T}{\partial x^2} + \frac{\partial^2 T}{\partial y^2} = \frac{1}{k}\frac{\partial T}{\partial t},$$

where y(x) gives the vertical deformation of the first plurality of thermally deformable reflective members 20 along their length (i.e., in the x direction), and T(x,y,t) is the temperature distribution in the member (see "The Theory of Thermal Stress," by Bruno A. Boley and Jerome H. Weiner, Robert Krieger Publishing Co., Malabar Fla., 1985). The deformation y(x) is given by the following equation:

$$y(x) = \sum_{j=1}^{2} (-1)^j \left[ -\frac{M_j \langle x \rangle^2}{2EI} + \frac{R_j \langle x \rangle^3}{6EI} - \frac{M \langle x - x_j \rangle^2}{2EI} \right],$$

where $x_j$ defines the edge of the heated end sections 26 of the top layer 22 (positions $x_1$ and $x_2$ in FIG. 6), and $$M_j = \frac{M[2x_j(L - x_j) - (L - x_j)^2]}{L^2} \text{ and } R_j = \frac{6M[2x_j(L - x_j)]}{L^3}$$

The expression $(x-x_j)^2$ has the following meaning $$\langle x - x_j \rangle^2 = \begin{cases} 0 & x < x_j \\ (x - x_j)^2 & x > x_j \end{cases}$$

Figure 7:
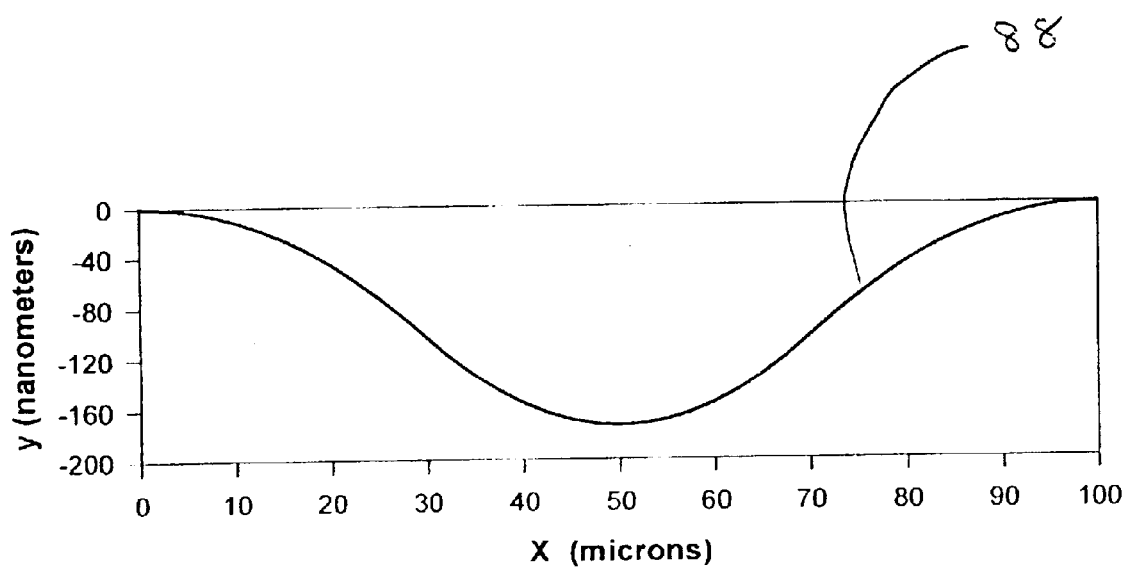
FIG. 7 is a plot of the deformation profile of an activated thermally deformable member.

In these equations $$M = \frac{\sum_{k=1}^{2} \frac{E_k}{1 - v_k^2}\left(\frac{h_k^2 - h_{k-1}^2}{2}\right)}{\sum_{k=1}^{2} \frac{E_k}{1 - v_k^2}(h_k - h_{k-1})} \sum_{k=1}^{2} \frac{E_k \alpha_k T_k}{1 - v_k}(h_k - h_{k-1}) -$$

$$\sum_{k=1}^{2} \frac{E_k \alpha_k T_k}{1 - v_k}\left(\frac{h_k^2 - h_{k-1}^2}{2}\right),$$

and $$EI = \frac{\left(\sum_{k=1}^{2} \frac{E_k}{1 - v_k^2}(h_k - h_{k-1})\right)\left(\sum_{k=1}^{2} \frac{E_k}{1 - v_k^2}\left(\frac{h_k^3 - h_{k-1}^3}{3}\right)\right) - \left(\sum_{k=1}^{2} \frac{E_k}{1 - v_k^2}\left(\frac{h_k^2 - h_{k-1}^2}{2}\right)\right)^2}{\sum_{k=1}^{2} \frac{E_k}{1 - v_k^2}(h_k - h_{k-1})},$$

where $E_i$, $v_i$, and $\alpha_i$ are the Young's modulus, poison ratio and coefficient of thermal expansion, of the i'th layer of each of the first plurality of thermally deformable reflective members 20. $T_i$ are the temperatures of the end sections 26 of the i'th layer of each of the first plurality of thermally deformable reflective members 20 (i=1 for the top layer 22, and i=2 for the bottom layer 24). The analysis above applies to a deformable member with constant cross sectional dimensions, uniform material properties along its length, and negligible heating across its midsection 28. A typical plot of a deformation profile 88 of a single one of the first plurality of thermally deformable members 20 is shown in FIG. 7. This plot represents the deformation of a 3 micron wide, 100 micron long thermally deformable member that has a 0.4 micron thick aluminum top layer 22, and a 0.4 micron thick silicon nitride bottom layer 24. The activation is V=66 mV. The average deformation along the midsection 28 is given by $$y_{ave} = \frac{1}{x_2 - x_1}\int_{x_1}^{x_2} y(x)\,dx.$$

Therefore, to diffract an incident light wave having a wavelength λ, the light modulator 10 would be designed to operate such that $y_{ave}=\lambda/4$. In the profile of FIG. 7, $y_{ave}=$ 162.5 nm which corresponds to a wavelength λ=650 nm.

FIG. 8 shows a top view of a preferred embodiment of the top layer 22 of the first plurality of thermally deformable reflective members 20. The electrical connection to conductive elements 50 and 52 is shown in an activated state. The top layer is shown as a shaded region, and the direction of current is indicated by flow arrows 90. The top layer 22 has end sections 26 and a midsection 28. The end sections 26 have a narrower conductive path 92 than the midsection 28 as shown. Consequently, the end sections 26 have a higher resistance than the midsection 28 while at the same time carrying the same level of current. Therefore, during activation the end sections 26 achieve a higher temperature than the midsection 28 and this causes each one of the first plurality of thermally deformable reflective members 20 to deform downward as described above. It is important to note that although the end sections 26 provide a narrow electrical conductive path, they are thermally conductive across a substantial portion of their width and therefore permit the rapid diffusion of heat across a substantial portion of this width. It will be understood that when the term "applying current through a top layer 22 is applied" it also encompasses a situation where the current is directed around the end sections 26 of the top layer 22 and does not have to flow across the entire top layer 22.

Figure 9:
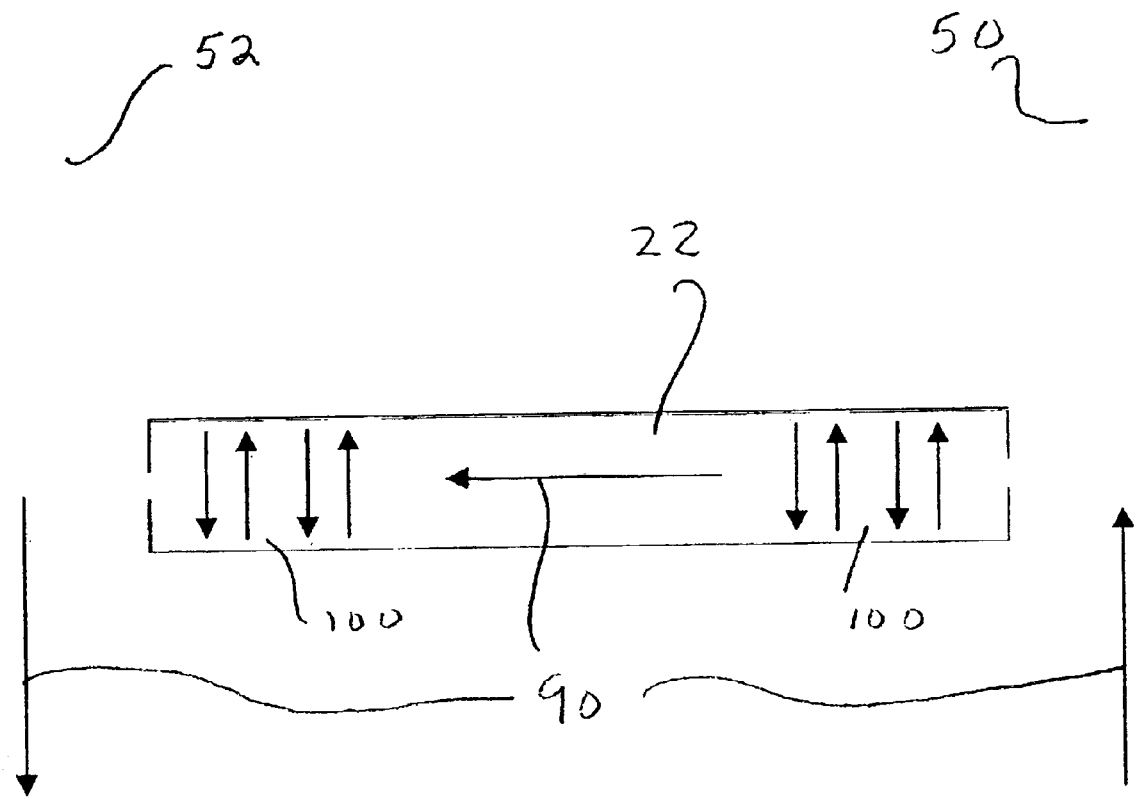
FIG. 9 is a top schematic view of an alternate embodiment of a thermally deformable member showing the conductive top layer.

FIG. 9 shows a top view of an alternate embodiment of the top layer 22 of the first plurality of thermally deformable reflective members 20. Its electrical connection to conductive elements 50 and 52 is shown in an activated state. The top layer 22 shown as a shaded region, and the direction of current is indicated by flow arrows 90. The top layer 22 has end sections 26 and a midsection 28. The end sections 26 have a relatively narrow serpentine conductive path 100 as shown. Consequently, the end sections 26 have a higher resistance than the midsection 28, which has a wider conductive path, while at the same time carrying the same level of current. Therefore, during activation the end sections 26 achieve a higher temperature than the midsection 28 and this causes each one of the first plurality of thermally deformable reflective members 20 to deform downward as described above. It is important to note that although the end sections 26 provide a narrow electrical conductive path, they are thermally conductive across a substantial portion of the width, and therefore permit the rapid diffusion of heat across a substantial portion of this width.

Figure 10:
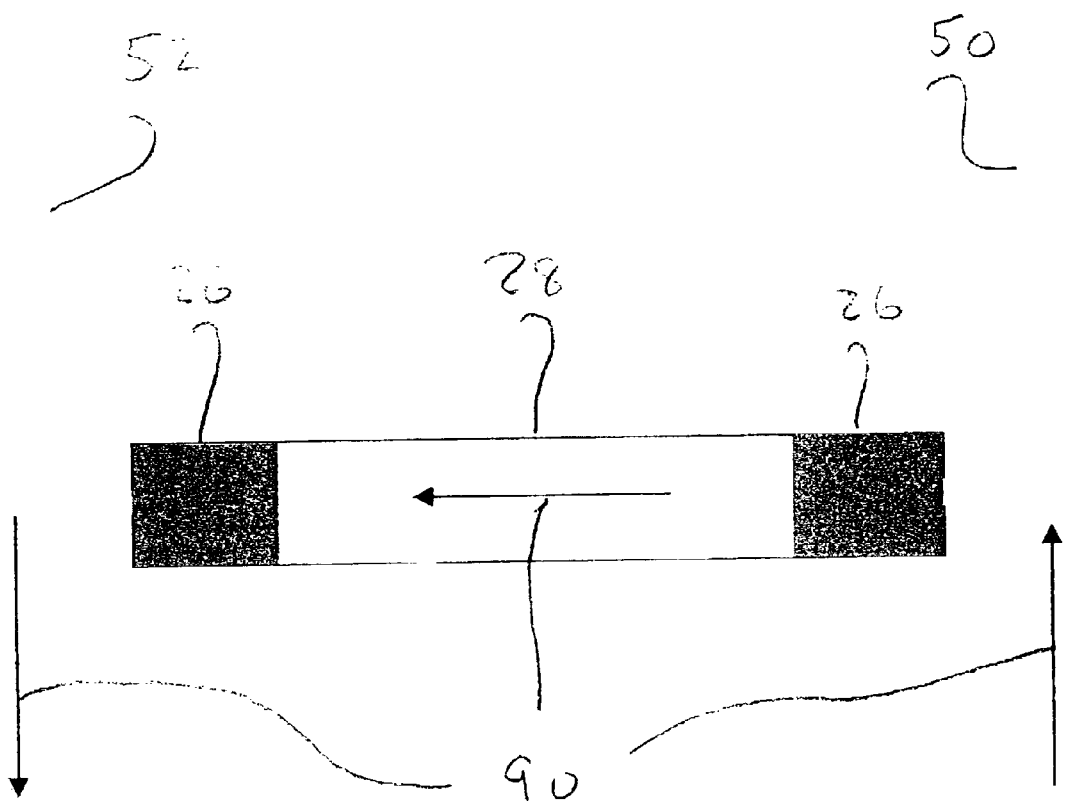
FIG. 10 is a top schematic view of an alternate embodiment of a thermally deformable member showing the conductive top layer.
Figure 11:
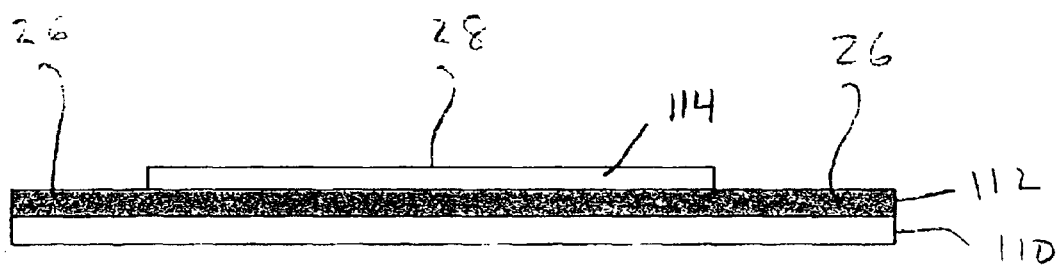
FIG. 11 shows a cross sectional schematic view of an alternate embodiment of the thermally deformable member shown in FIG. 10.

FIGS. 10 and 11 show top and cross sectional views of another alternate embodiment of each one of the first plurality of thermally deformable reflective members 20, respectively. The electrical connection to conductive elements 50 and 52 is shown in an activated state, and the direction of current is indicated by flow arrows 90. In this embodiment each one of first plurality of thermally deformable reflective members 20 has three layers, a bottom support layer 110, a resistive layer 112 disposed over the support layer 110, and a reflective conductive layer 114 disposed over, and in electrical contact with, the midsection of the resistive layer 112. The reflective conductive layer 114 is chosen to have a much lower resistance than the resistive layer 112 and therefore conducts the majority of the current, thereby shunting the current flow through the midsection 28 of the resistive layer 112 to which it is electrically connected. During activation, the end sections 26 of the resistive layer 112 carry more current than the midsection 28 and therefore achieve a higher temperature than the midsection 28. This causes each one of first plurality of thermally deformable reflective members 20 to deform downward as described above. The resistive layer 112 is preferably titanium aluminide. The reflective conductive layer 114 is preferably selected from the group consisting of: aluminum, copper, gold, silver, and alloys thereof.

Figure 12:
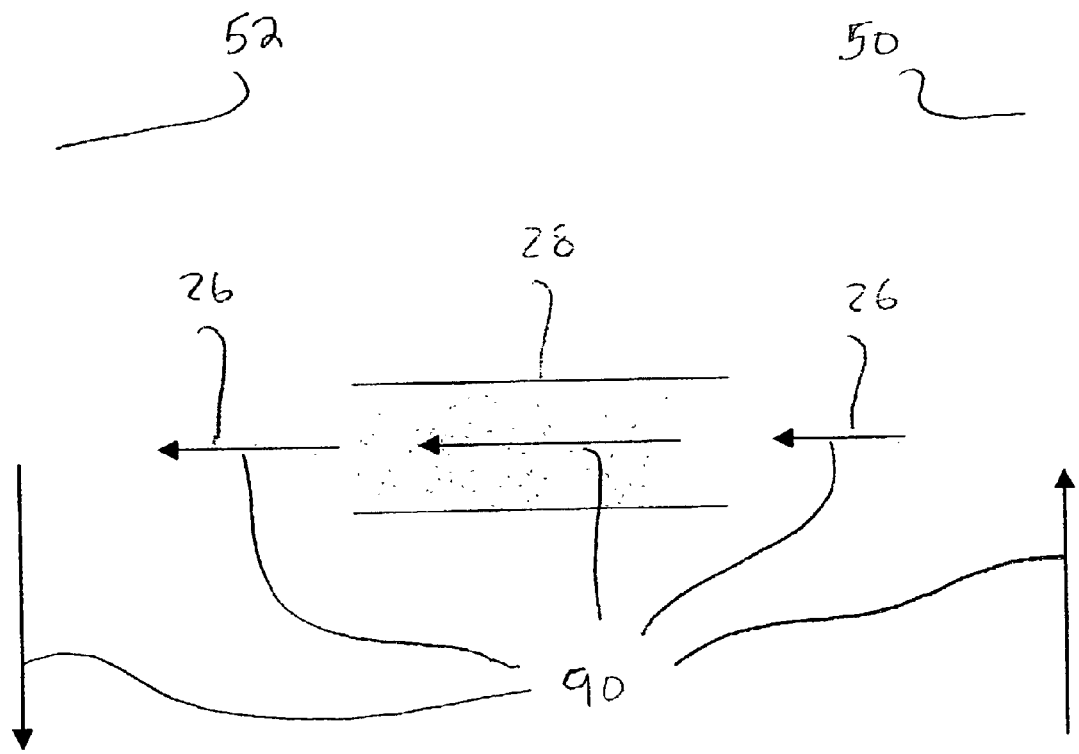
FIG. 12 is a top schematic view of an alternate embodiment of a thermally deformable member showing the conductive top layer.

FIG. 12 shows a top view of an alternative embodiment of each one of the first plurality of thermally deformable reflective members 20. The electrical connection to conductive elements 50 and 52 is shown in an activated state. The top layer 22 is shown as a shaded region, and the direction of current is indicated by flow arrows 90. The top layer 22 has end sections 26 and a midsection 28. The end sections 26 are narrower than the midsection 28 as shown. Consequently, the end sections 26 have a higher resistance than the midsection 28 while at the same time carrying the same level of current. Therefore, during activation the end sections 26 achieve a higher temperature than the midsection 28 and this causes each one of the first plurality of thermally deformable reflective members 20 to deform downward as described above.

The invention has been described in detail with particular reference to certain preferred embodiments thereof, but it will be understood that variations and modifications can be effected within the spirit and scope of the invention.

PARTS LIST:

| 10 | light modulator |
|---|---|
| 12 | structure |
| 14 | base |
| 16 | cavity |
| 18 | side walls |
| 20 | first plurality of thermally deformable reflective members |
| 22 | top layer |
| 24 | bottom layer |
| 26 | end sections |

-continued

PARTS LIST:

| 28 | midsection |
|---|---|
| 40 | second plurality of fixed reflective members |
| 42 | top light reflecting layer |
| 44 | bottom support layer |
| 50 | conductive element |
| 52 | conductive element |
| 60 | switch |
| 70 | power source |
| 80 | lightwave |
| 82 | arrow |
| 84 | arrow |
| 86 | arrows |
| 88 | deformation profile |
| 90 | flow arrows |
| 100 | serpentine conductive path |
| 110 | support layer |
| 112 | resistive layer |
| 114 | reflective conductive layer |

What is claimed is:

1. A modulator for modulating an incident beam of light, comprising:

a structure defining a cavity and having a base and side walls surrounding the base;

a first plurality of equally spaced apart thermally deformable reflective members having opposing end edges integrally formed in the side walls of the structure above the cavity, wherein each one of the plurality of thermally deformable members includes at least a top layer and a bottom layer, wherein the top layer is conductive, and has a higher coefficient of thermal expansion than the bottom layer, and wherein the top layer has end sections adjacent to the support walls and a midsection, with the end sections having a higher resistance than the midsection;

a second plurality of equally spaced apart, electrically isolated fixed members having opposing end edges integrally formed in the side walls of the structure just above the cavity, wherein each one of the second plurality of fixed members has a reflective top surface for reflecting the incident beam of light, and wherein each fixed member of the second plurality of fixed members is arranged between adjacent spaced apart deformable members of the plurality of thermally deformable members such that the deformable members and the fixed members form a substantially planar light reflection surface; and means for applying current through the top layers of the first plurality of equally spaced apart thermally deformable reflective members that causes them to deflect into the cavity and away from the substantially planar light reflection surface, whereby light reflecting from the first plurality of thermally deformable reflective members destructively interferes with light reflected from the second plurality of fixed members thereby causing modulation of the incident light.

2. The modulator of claim 1 furthering including a reflective layer formed on the top layer of the thermally deformable reflective members.

3. The modulator of claim 1 wherein the end sections and the midsection are formed of the same material and the end sections have a smaller cross sectional area than the midsection.

4. The modulator of claim 1 wherein the end sections and the midsection are formed of different materials.

5. The modulator of claim 1 wherein the bottom layer includes silicon nitride.

6. The modulator of claim 1 wherein the top layer includes reflective materials selected from the group consisting of: aluminum, copper, gold, silver, and alloys thereof.

7. The modulator of claim 1 wherein reflective top surface of the second plurality of fixed members includes materials selected from the group consisting of: aluminum, copper, gold, silver, and alloys thereof.

8. The modulator of claim 1 wherein the plurality of fixed members each include a support layer and top reflective layer.

9. A modulator for modulating an incident beam of light, comprising:

a structure defining a cavity and having a base and side walls surrounding the base;

a first plurality of equally spaced apart thermally deformable reflective members having opposing end edges integrally formed in the side walls of the structure above the cavity, wherein each one of the plurality of thermally deformable member includes a bottom support layer, a resistive layer disposed over the support layer and extending from side wall to side wall, and a reflective conductive layer disposed over, and in electrical contact with, the midsection of the resistive layer so that a high resistance is presented to current flow adjacent to each of the side walls and a lower resistance is presented in the midsection of the thermally deformable member, and wherein the coefficient of thermal expansion of the resistive layer is higher than the coefficient of thermal expansion of the support layer;

a second plurality of equally spaced apart, electrically isolated fixed members having opposing end edges integrally formed in the side walls of the structure just above the cavity, wherein each one of the second plurality of fixed members has a reflective top surface for reflecting the incident beam of light, and wherein each fixed member of the second plurality of fixed members is arranged between adjacent spaced apart thermally deformable members such that the first and second light reflection layers form a substantially planar light reflection surface; and means for applying current through the top layers of the first plurality of equally spaced apart thermally deformable reflective members that causes them to deflect into the cavity and away from the substantially planar light reflection surface, whereby light reflecting from the first plurality of thermally deformable reflective members destructively interferes with light reflected from the second plurality of fixed members thereby causing modulation of the incident light.

10. The modulator of claim 9 wherein the conductive reflective layer is selected from the group consisting of: aluminum, copper, gold, silver, and alloys thereof.

11. The modulator of claim 9 wherein the resistive layer is titanium aluminide.

* * * * *